June 26, 1962   J. GRIFFIOEN   3,040,626
OPTICAL LIGHT-TIGHT JOINT
Filed Jan. 21, 1960   2 Sheets-Sheet 1

INVENTOR.
JAN GRIFFIOEN

June 26, 1962 J. GRIFFIOEN 3,040,626
OPTICAL LIGHT-TIGHT JOINT
Filed Jan. 21, 1960 2 Sheets-Sheet 2

INVENTOR.
JAN GRIFFIOEN
BY
Wenderoth, Lind + Ponack
Attys.

United States Patent Office 3,040,626
Patented June 26, 1962

3,040,626
OPTICAL LIGHT-TIGHT JOINT
Jan Griffioen, Delft, Netherlands, assignor to N.V. Optische Industrie de Oude Delft, Delft, Netherlands
Filed Jan. 21, 1960, Ser. No. 3,869
Claims priority, application Netherlands Feb. 3, 1959
5 Claims. (Cl. 88—68)

The invention relates to an optical joint forming a light-tight connection between a tubular part that can rotate through a limited angle about an axis which is perpendicular to the axis of the tubular component, and a second part, which second part has, relative to the axis of rotation, a rotationally symmetrical slide track for one end of the tubular part, in which slide track a slot is provided for the passage of light, there being incorporated in the second part a plane deflecting mirror which can turn about the same axis at half the speed of the tubular part, the tubular part being furthermore provided with a hood fitting over the slide track so as to prevent the passage of unwanted light through the slot.

Joints of this kind are used, for instance, in optical instruments, in order to establish a connection between the eye-piece and the remainder of the instrument in cases where the viewing direction of the eye-piece is necessarily variable. Obviously the hood that is joined to the eye-piece must comprise an arc of such a size that at every position of the eye-piece the slot in the fixed part through which the light-beam enters the eye-piece is entirely covered by the hood, so that no unwanted light can intrude. For this purpose the hood must naturally extend over a much larger portion of the slide track than the slot, so that when the eye-piece is in one extreme position the slot at the opposite end is not open. This entails the drawback that the hood generally comes up against other parts of the instrument when the eye-piece is only turned to a small extent, which means that the range of adjustment is very limited.

According to the invention this drawback is obviated to a large extent by the use of a covering slide having an opening for the passage of the light-beam, which slide rotates about the same axis as the tubular part and moves along the slide track, the said slide being rigidly fixed to the deflecting mirror, the whole being so contrived that at every position of the tubular part the slide covers up the parts of the slot that are left exposed by the hood.

The length of the hood attached to the tubular part may, in proportion to the length of the slot, be small according to the invention, so that the tubular part can rotate through a relatively large angle without the hood coming up against any parts of the instrument. This is rendered possible because, during the movement of the tubular part, the hood of that part can leave certain parts of the slot uncovered, as the slide, moving in the same direction at half the speed, will always be able to cover these parts. The turning of the slide can be effected without the use of any additional devices, as, according to the invention, it is possible for this purpose to make use of the rotation of the deflecting mirror which is in any case necessary. In a preferred embodiment of the invention the slide consists of two parallel sectors which are joined together at their broad end by two covering plates that leave an opening exposed and at the other end by the mounting of the deflecting mirror.

In the joint according to the invention it is possible under certain circumstances that at the extreme positions between the hood and the slide some unwanted light may still pass tangentially through the slot. Although this light cannot fall directly upon the mirror and hence, if the interior of the instrument is finished dull black, will not be unduly disturbing, it will be preferable according to the invention to eliminate this unwanted light entirely by providing the slide with two ledges on either side of the opening.

According to the invention the movement of the slide and mirror is preferably derived from that of the tubular part of the instrument. Any known system of levers or toothed wheels may be used to transmit the rotation of the tubular part to the slide.

In the system according to the invention it is, however, preferred to provide both the slide and the tubular part with slots curved in the form of spirals of Archimedes, the slope of the slot in the tubular component being equal to half the slope of the slot in the slide, in which system a movable pin is provided which extends through the slots in a direction perpendicular to the plane of the slots, which pin furthermore moves in a guide attached to the second part, the whole being so contrived that on rotation of the tubular part of the slot of that part, cooperating with the aforementioned guide, causes a shifting of the pin which, by means of the slot with the steeper slope, brings about a rotation of this slide equal to half the rotation of the tubular component.

The invention will now be further clarified by reference to the drawings.

Figure 1:
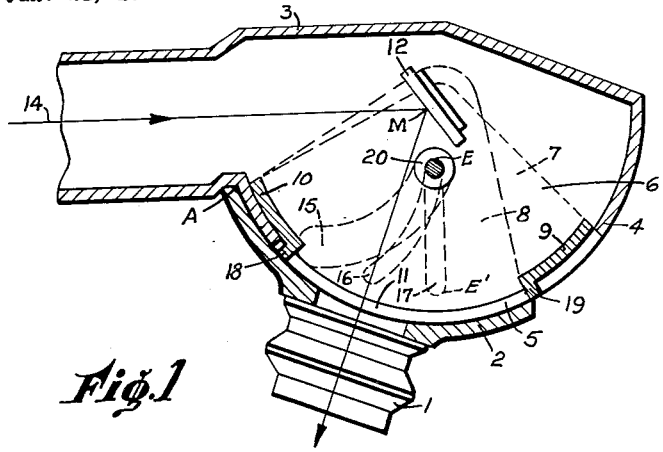
FIGURES 1, 2 and 3 are horizontal sections of the optical joint for an eye-piece, according to the invention, at three different positions of the eye-piece.
Figure 2:
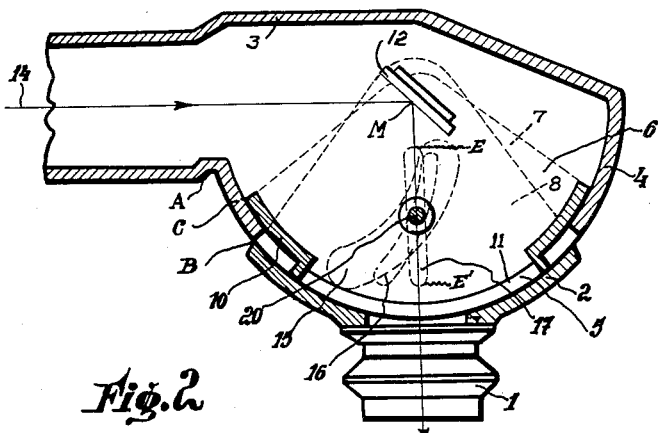
Figure 3:
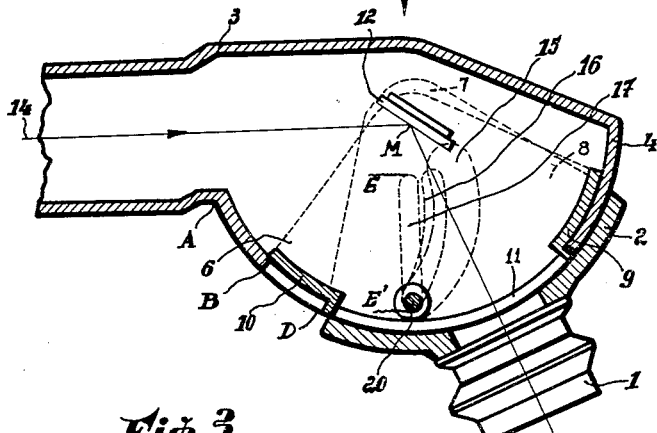
Figure 4:
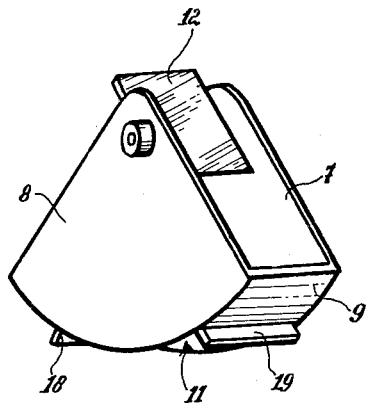
FIG. 4 is a perspective drawing of the slide.
Figure 5:
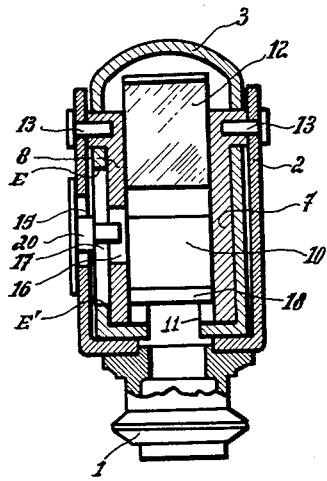
FIG. 5 is a vertical section of the optical joint according to FIGURES 1, 2 and 3 with the eye-piece in the middle position.

Item 1 in FIGURES 1, 2, 3 and 5 is the eye-piece of an optical instrument. The end of the eye-piece 1 is provided with a hood 2 which only partly covers slot 5 in the slide track 4 of the second part 3 of the instrument. The slide 6 according to the invention consists of two parallel sectors 7 and 8 which are joined together at their broad end by the covering plates 9 and 10, between which there is an opening 11. The covering plates are curved to match the inner surface of the slide track. Positioned on either side of the opening 11 are two ledges 18 and 19. A deflecting mirror 12 is fixed to the other end of the sectors 7 and 8 (FIGURES 4 and 5). Both the eye-piece 1 and the slide 6 with mirror 12 are rotatable about pins 13 as seen in FIG. 5. The light-beam 14 travels via mirror 12 through the opening 11 of the covering slide 6 in the eye-piece. On rotation of the housing 1 through angle AMB, slide 6 turns through angle AMC. This angle AMC is actually half the angle AMB. The light-beam 14 again passes via mirror 12 into eye-piece 1 as seen in FIG. 3. On further rotation of the eye-piece 1 through angle BMD slide 6 rotates through angle CMB. Angle CMB is now similarly equal to half the angle BMD (FIGURES 1, 2 and 3).

It is furthermore evident from FIGURES 1, 2 and 3 that the covering plates 9 and 10 of slide 6, which move along the slide track 4 of the second part 3, always completely cover any parts that are left uncovered by the hood 2. At the extreme positions of the tubular part 1 the ledges 18 and 19 of slide 6 prevent incident slanting light-rays from passing through slot 5 (FIGURES 1 and 3). A perfect light-tight connection is now established between the eye-piece 1 and the second component 3 of the optical system.

Hood 2 has a slot 15 curved in the form of a spiral of Archimedes. The second part 3 of the instrument is provided with a straight guiding slot 17. A slot 16 similarly curved in the form of a spiral of Archimedes is provided in sector 8 of slide 6. The slope of slot 15 is half the slope of slot 16. The slots 15 and 16 and the guide 17 partly overlap. A pin 20 passes through the slots 15 and 16 and the guiding slot 17. Pin 20 is perpendicular to the planes of the slots and can move in the direction E—E' in guiding slot 17. On rotation of eye-piece 1 the slot 15 turns through a certain angle. As a result pin 20 is pressed downward in the direction E' in guide 17. This shifting of pin 20 causes a rotation of slot 16. The angle through which slot 16 turns is half the angle through which slot 15 turns as a result of the double steep slope of slot 16.

In FIGURE 3 an eye-piece is shown at the extreme position. Pin 20 is therefore situated at an extreme position, as are also slots 15 and 16. When eye-piece 1 is rotated back the above mentioned rotation of slots 15 and 16 and the shifting of pin 20 are repeated, but this time in the opposite direction, until the other extreme position of tubular part 1, slots 15 and 16 and pin 20 is reached (FIGURE 1).

What I claim is:

1. An optical joint forming a light-tight connection comprising a tubular part rotatable through a certain angle about an axis perpendicular to the axis of said tubular part, a second part having relative to said axis of rotation, a rotationally symmetrical slide track for one end of said tubular part, said slide track having a slot for the passage of light, a plane deflecting mirror mounted in said second part rotatable about said axis of rotation at half the speed of said tubular part, a hood on said tubular part fitting over said slide track to prevent the passage of unwanted light through said slot, a covering slide having an opening for the passage of the light-beam rotatable about said axis of rotation and movable along said slide track, said slide being fixed to said deflecting mirror so that at every position of said tubular part said slide covers up the parts of the slot that are left exposed by the hood.

2. An optical joint according to claim 1, wherein said covering slide is formed by two parallel sectors which are joined together at their broad end by two spaced covering plates leaving an opening therebetween and at the other end by the holder of said deflecting mirror.

3. An optical joint according to claim 2, wherein said covering slide is provided at each side of said opening with a ledge radial to said axis of rotation to shut off incident slanting light-rays.

4. An optical joint according to claim 1, wherein both said covering slide and said tubular part have slots curved in the form of spirals of Archimedes, the slope of the slot of the tubular part being equal to half the slope of the slot in the slide, a movable pin passing through said last named slots in a position perpendicular to the plane of said slots, a guide attached to said second part for said pin, so that on rotation of said tubular part the slot therein, cooperating with the aforementioned guide, causes a shifting of the pin which, by means of the slot with the steeper slope, brings about a rotation of this slide equal to half the rotation of the tubular part.

5. An optical instrument comprising a housing, a plane deflecting mirror in said housing positioned to receive light rays travelling in said housing and reflect such light rays through a slot in said housing, a tubular part hingedly connected to said housing for receiving said reflected light rays, said tubular part being pivotable through a limited angle about an axis perpendicular to the longitudinal axis of said part, means connecting said tubular part and said mirror to rotate the latter simultaneously with said tubular part about the same axis at half the angular speed of the tubular part, said housing having an arcuate end face containing said slot and showing rotational symmetry with respect to said pivot axis, said tubular part having an arcuate base part conforming in shape to said end face of said housing and covering part of said slot, a covering member having an end face also conforming in shape to said end face of said housing and having an aperture in the midst thereof for the passage of light rays reflected by said mirror, and means to rotate said covering member at the same angular speed and about the same axis as said mirror, the angular position of the aperture in said covering member being at all angles intermediate between those of said slot in said housing and said tubular member whereby at all angles said covering member prevents the passage of light through parts of said slot in the housing which are left exposed by said base part of said tubular part.

References Cited in the file of this patent

UNITED STATES PATENTS

| | | |
|---|---|---|
| 1,748,624 | Shively | Feb. 25, 1930 |
| 2,304,921 | Hopkins | Dec. 15, 1942 |
| 2,859,660 | Lucas | Nov. 11, 1958 |
| 2,946,256 | Tiffany | July 26, 1960 |